(12) United States Patent
Scheckel et al.

(10) Patent No.: US 11,338,231 B2
(45) Date of Patent: May 24, 2022

(54) OIL MANAGEMENT STRUCTURES IN CRANKCASE VENTILATION

(71) Applicant: CUMMINS FILTRATION IP, INC., Columbus, IN (US)

(72) Inventors: Benjamin L. Scheckel, Stoughton, WI (US); Miao Li, McFarland, WI (US); Bradley A. Smith, Columbus, IN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 0 days.

(21) Appl. No.: 16/763,049

(22) PCT Filed: Nov. 1, 2018

(86) PCT No.: PCT/US2018/058686
§ 371 (c)(1),
(2) Date: May 11, 2020

(87) PCT Pub. No.: WO2019/099207
PCT Pub. Date: May 23, 2019

(65) Prior Publication Data
US 2020/0384398 A1    Dec. 10, 2020

Related U.S. Application Data

(60) Provisional application No. 62/586,479, filed on Nov. 15, 2017.

(51) Int. Cl.
*B01D 50/00*       (2022.01)
*B01D 45/08*       (2006.01)
(Continued)

(52) U.S. Cl.
CPC ............. *B01D 45/08* (2013.01); *B01D 45/16* (2013.01); *B01D 46/003* (2013.01); *F01M 13/00* (2013.01); *B01D 50/20* (2022.01)

(58) Field of Classification Search
CPC ...... B01D 45/08; B01D 45/16; B01D 46/003; B01D 50/002; F01M 13/00; F01M 13/04;
(Continued)

(56) References Cited

U.S. PATENT DOCUMENTS 4,723,529 A * 2/1988 Yokoi ............... F01M 13/0416
                                                            123/41.86
6,290,738 B1    9/2001 Holm
(Continued)

FOREIGN PATENT DOCUMENTS

CN         102105205 A      6/2011
FR           3033503         9/2016

OTHER PUBLICATIONS

International Search Report and Written Opinion issued for PCT/US2018/058686, dated Jan. 15, 2019, 12 pages.
(Continued)

*Primary Examiner* — Dung H Bui
(74) *Attorney, Agent, or Firm* — Foley & Lardner LLP (57) ABSTRACT

A gas-liquid separator includes a housing. The housing includes an inlet structured to receive a blowby gas stream from a crankcase. a cleaned air outlet, and a liquid outlet. A cover is disposed downstream from the inlet and upstream from the liquid outlet. The cover includes a baffle disposed over the blowby gas stream flow path from the inlet. The blowby gas stream impacts the baffle and separates liquid and aerosol contained in the blowby gas stream. A flange extends substantially axially downward from a side of the baffle. The flange is tapered substantially axially downward forming an inner surface. The inner surface is structured to route the separated liquid toward the liquid outlet. The inner surface biases separated liquid away from shedding toward the cleaned air outlet.

21 Claims, 6 Drawing Sheets

(51) Int. Cl.
  *B01D 45/16* (2006.01)
  *B01D 46/00* (2022.01)
  *F01M 13/00* (2006.01)
  *B01D 50/20* (2022.01)

(58) Field of Classification Search
  CPC .... F01M 2013/0433; F01M 2013/0438; Y10S 55/14
  See application file for complete search history.

(56) References Cited

U.S. PATENT DOCUMENTS

| | | | |
|---|---|---|---|
| 7,604,676 B2 | 10/2009 | Braziunas | |
| 8,075,654 B2 | 12/2011 | Holzmann et al. | |
| 8,152,884 B1* | 4/2012 | Severance | B01D 46/0087 55/462 |
| 8,915,237 B2* | 12/2014 | Copley | F01M 13/021 123/572 |
| 9,138,671 B2* | 9/2015 | Janakiraman | B01D 45/08 |
| 9,737,835 B2* | 8/2017 | Peck | B01D 46/0023 |
| 10,982,577 B2* | 4/2021 | Fenske | F01M 13/04 |
| 2006/0059875 A1* | 3/2006 | Malgorn | B01D 45/08 55/468 |
| 2009/0100811 A1* | 4/2009 | Scheckel | B01D 46/0041 55/448 |
| 2009/0120854 A1* | 5/2009 | Parikh | F01M 13/04 210/137 |
| 2010/0024366 A1 | 2/2010 | Hodges et al. | |
| 2010/0101425 A1* | 4/2010 | Herman | B01D 45/08 96/400 |
| 2011/0023429 A1* | 2/2011 | Janakiraman | B01D 45/08 55/434 |
| 2011/0210061 A1 | 9/2011 | Li et al. | |
| 2012/0318215 A1 | 12/2012 | Copley et al. | |
| 2014/0033921 A1 | 2/2014 | Peck et al. | |
| 2014/0033922 A1 | 2/2014 | Peck et al. | |
| 2016/0032798 A1* | 2/2016 | Herman | B01D 46/10 95/268 |
| 2018/0015401 A1 | 1/2018 | Bonne et al. | |
| 2019/0299134 A1* | 10/2019 | Herman | B01D 45/14 |

OTHER PUBLICATIONS

First Office Action issued for Chinese Patent Application No. 201880072553.4 dated May 7, 2021, 7 pages.

Office Action issued for Korean Patent Application No. KR 10-2020-7012782, dated Sep. 28, 2021, 9 pages.

\* cited by examiner

OIL MANAGEMENT STRUCTURES IN CRANKCASE VENTILATION

CROSS REFERENCE TO RELATED APPLICATIONS

The present application is a national stage of PCT Application No. PCT/US2018/058686, filed Nov. 1, 2018 which claims priority to U.S. Provisional Patent Application No. 62/586,479, filed Nov. 15, 2017 and entitled "Oil Management Structures in Crankcase Ventilation." The contents of these applications are incorporated herein by reference in their entirety and for all purposes.

TECHNICAL FIELD

The present application relates to crankcase ventilation systems.

BACKGROUND

During operation of an internal combustion engine, a fraction of combustion gases can flow out of the combustion cylinder and into the crankcase of the engine. These gases are often called "blowby" gases. The blowby gas stream includes a mixture of aerosols, oils, and air. If vented directly to the ambient, the blowby gas stream can potentially harm the environment and/or may be subject to government emissions regulations. Accordingly, the blowby gas stream is typically routed out of the crankcase via a crankcase ventilation system. The crankcase ventilation system may pass the blowby gas stream through a separator to remove aerosols and oils contained in the blowby gas stream. The filtered blowby gas stream is then either vented to the ambient (in open crankcase ventilation systems) or routed back to the air intake for the internal combustion engine for further combustion (in closed crankcase ventilation systems).

One type of separator uses inertial impaction air-oil separation for removing oil particles from the crankcase blowby gas by accelerating the blowby gas stream to high velocities through nozzles or orifices and directing same against an impactor, causing a sharp directional change effecting the oil separation. Another type of separator uses coalescence in a coalescing filter for removing oil droplets. In other arrangements, the separator may rotate to increase the filter efficiency of the coalescing filter elements by rotating the filter element during filtering.

SUMMARY

According to a set of embodiments, a gas-liquid separator includes a housing. The housing includes an inlet structured to receive a blowby gas stream from a crankcase, a cleaned air outlet, and a liquid outlet. A cover is coupled to the housing. The cover is disposed downstream from the inlet and upstream from the liquid outlet. The cover includes a baffle disposed over the blowby gas stream flow path from the inlet. The blowby gas stream impacts the baffle and separates liquid and aerosol contained in the blowby gas stream. A flange extends axially downward from a side of the baffle. The flange is tapered axially downward forming an inner surface. The inner surface is structured to route the separated liquid toward the liquid outlet. The inner surface biases separated liquid away from shedding toward the cleaned air outlet.

According to another set of embodiments, a cover is provided which is disposed downstream from an inlet and upstream from a liquid outlet of a crankcase ventilation system. The cover includes a baffle disposed over the blowby gas stream flow path from the inlet. The blowby gas stream impacts the baffle and separates liquid and aerosol contained in the blowby gas stream. A flange extends axially downward from a side of the baffle. The flange is tapered axially downward forming an inner surface. The inner surface is structured to route the separated liquid toward the liquid outlet. The inner surface biases separated liquid away from shedding toward a cleaned air outlet of the crankcase ventilation system.

These and other features, together with the organization and manner of operation thereof, will become apparent from the following detailed description when taken in conjunction with the accompanying drawings, wherein like elements have like numerals throughout the several drawings described below.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Referring to the figures generally, various embodiments of an oil management cover in a crankcase ventilation are shown and described. The oil management cover is disposed in a gas-liquid separator configured to remove liquid particles (e.g., oil particles/droplets) from a gas-liquid stream (e.g., blowby gas stream) from a crankcase of an internal combustion engine. The oil management cover includes a variety of arrangements, including ribs and baffles configured to receive separated liquid and to direct separated liquid away from a housing outlet and facilitate drainage. The oil management cover may be used in closed crankcase ventilation (CCV) systems and in open crankcase ventilation (OCV) systems, as well as other inertial gas-liquid separator applications. By altering the shape and features of the baffles and ribs in an oil management cover, the flow of the coalesced oil is directed to a particular location, reduces carryover, and limits re-entrainment of the separated liquid.

Figure 1A:
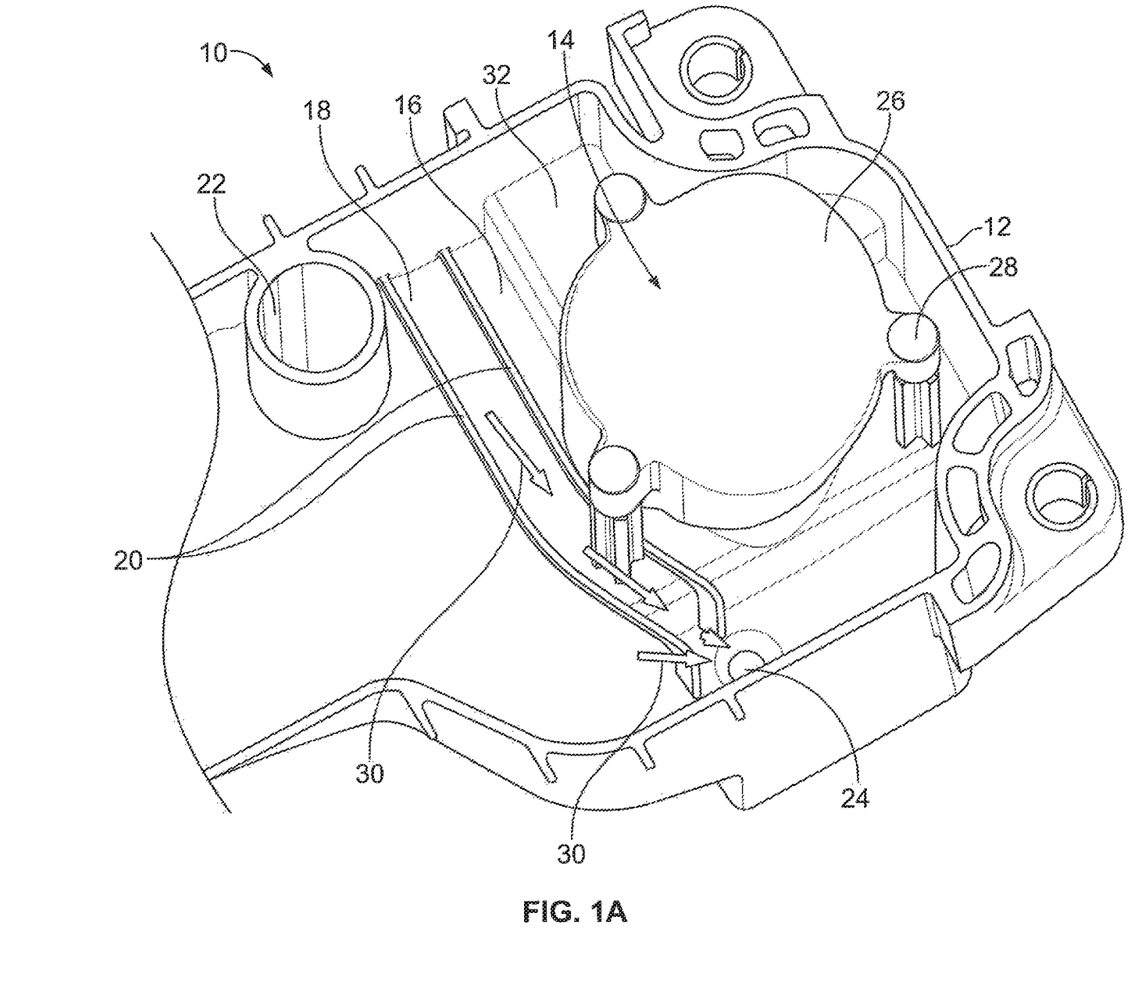
FIG. 1A shows a perspective view of a portion of a gas-liquid separator according to an example embodiment.
Figure 1B:
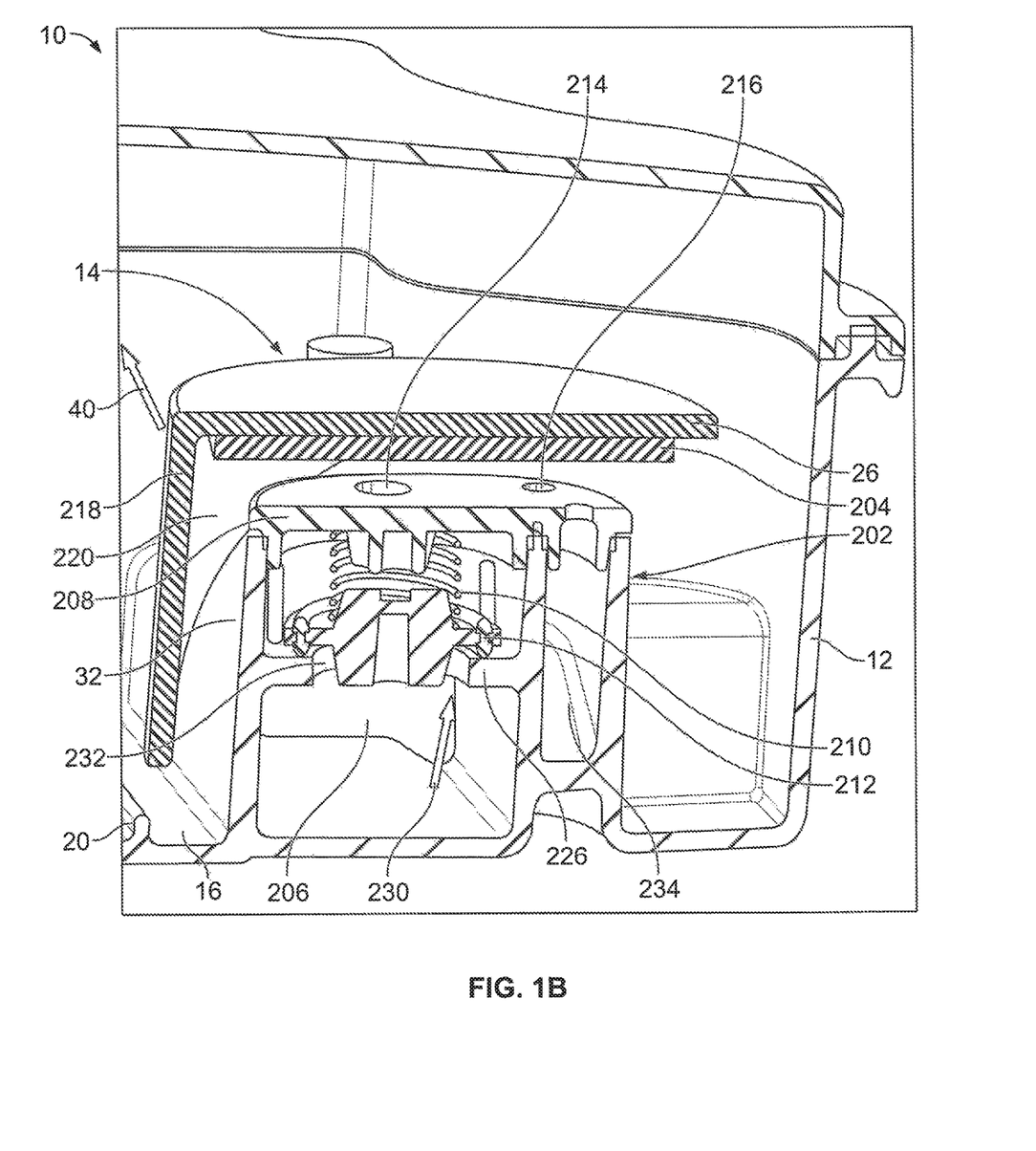
FIG. 1B shows a cross-sectional side view of the portion of the gas-liquid separator of FIG. 1A.
Figure 2:
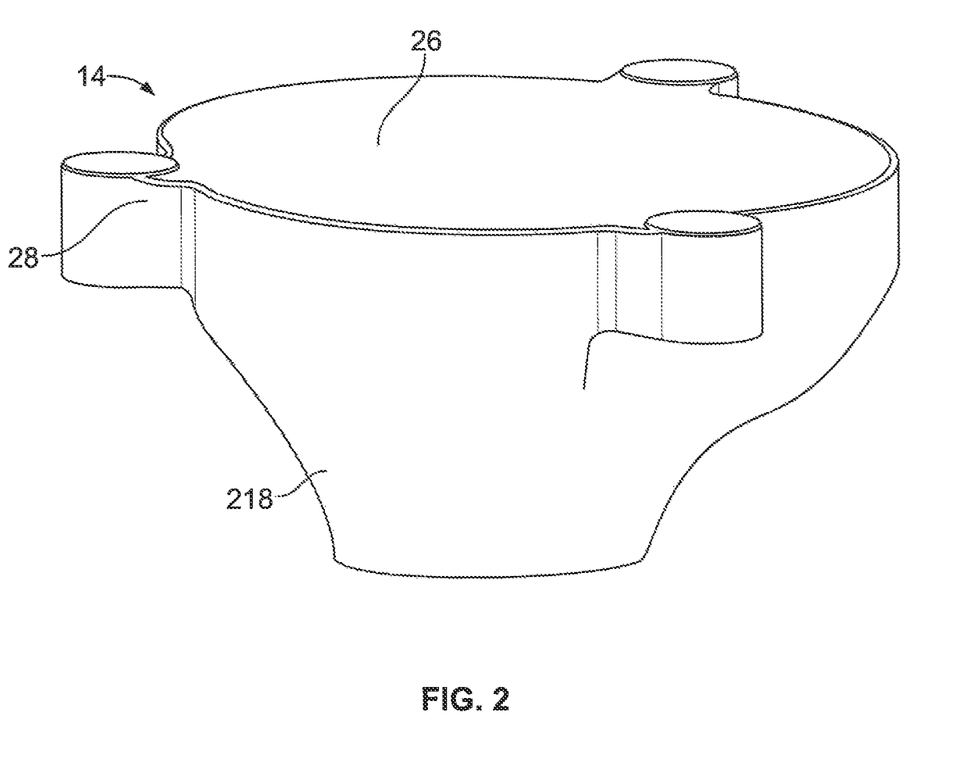
FIG. 2 shows a perspective view of the oil management cover of the gas liquid separator of FIG. 1A.

FIGS. 1A, 1B, & 2 show perspective views of various portions of a gas-liquid separator 10 including an oil management cover 14, according to an example embodiment. The gas-liquid separator 10 comprises a housing 12 having an inlet 206 for receiving a blowby gas stream 230, a cleaned air outlet 22 for discharging a separated clean air stream 40, a drain 24 (e.g., liquid outlet) for discharging separated liquid 30, a plurality of ribs 20, and the oil management cover 14. The housing 12 may be formed from single or multiple pieces. The oil management cover 14 may be removably coupled to the gas-liquid separator 10 via a plurality of posts 28. In other embodiments, the oil management cover 14 is molded/welded onto the gas-liquid separator 10 at the plurality of posts 28. Generally, a blowby gas stream 230 enters the gas-liquid separator 10 through the inlet 206 and passes through an inlet flow member 202. The inlet flow member 202 may be formed in the housing 12 of the gas-liquid separator 10 or may be removably coupled. Generally, the blowby gas stream 230 is accelerated while passing through the inlet flow member 202 and impacts the oil management cover 14 disposed over the inlet flow member 202, undergoing liquid particle separation (e.g., separation zone). Separated clean air 40 and separated liquid (e.g., oil droplets) 30 diverge from each other. The oil management cover 14 facilitates the flow path of the separated liquid 30 away from the cleaned air outlet 22 (to prevent re-entrainment) and towards the drain 24 to be discharged from the gas-liquid separator 10. In addition to the oil management cover 14, the plurality of ribs 20 provide additional direction of the separated liquid 30 flow path towards the drain 24 and not toward the cleaned air outlet 22.

The gas-liquid separator 10 comprises an inlet flow member 202 that is configured to receive a blowby gas stream 230 from a crankcase or similar structure. The inlet flow member 202 comprises a second flow path 232, a first flow path 234, and a nozzle plate 208. While shown including two flow paths (232, 234), in some embodiments, the inlet flow member 202 can include a single flow path or multiple flow paths. The inlet flow member 202 may include a gasket such as O-ring for sealed mounting to a component such as an engine crankcase. The nozzle plate 208 is disposed between the inlet 206 and the oil management cover 14. The nozzle plate 208 comprises a second orifice 214 and a first orifice 216, each configured to receive the blowby gas stream 230 from the inlet 206 and accelerate the blowby gas stream 230 in a downstream direction through the orifices 216, 214 and against the oil management cover 14. The second orifice 214 and the first orifice 216 may have a venturi or frustoconical shape to facilitate acceleration of the blowby gas stream 230. Each of the second flow path 232 and the first flow path 234 is in fluid communication with the inlet 206 and the second orifice 214 and the first orifice 216, respectively. While shown as a single orifice in the cross-sectional view, multiple orifices may comprise the second orifice 214 and the first orifice 216 above the second flow path 232 and the first flow path 234, respectively. In some embodiments, the inlet flow member 202 is a variable impactor with two regions, an open nozzle region (e.g., first flow path 234) and a variable nozzle region (e.g., second flow path 232). One such variable impactor is described, for example, in U.S. Pat. No. 8,118,909 (the contents of which are incorporated herein by reference). In some embodiments, the inlet flow member 202 includes a single flow path (e.g., not two regions as in the variable impactor) from the inlet 206 to the nozzle plate 208. One such fixed impactor is described, for example, in U.S. Pat. No. 6,290,738 (the contents of which are incorporated herein by reference).

The second flow path 232 comprises a valve 212 and a biasing member 210 downstream from the inlet 206 and upstream from the second orifice 214. The valve 212 and biasing member 210 are responsive to the pressure of blowby gas stream 230. The valve 212 is axially movable upwardly to an open position in response to pressure of blowby gas stream 230 overcoming the bias of biasing member 210, thereby allowing the blowby gas stream 230 to flow therethrough. The axial movement of the valve 212 into and out of engagement with a valve seat 226 respectively closes and opens the second flow path 232 to allow the blowby gas stream 230 to reach the second orifice 214. The valve 212 may include a gasket for sealingly engaging the valve seat 226. The first flow path 234 is parallel to the second flow path 232. Contrary to the second flow path 232, the first flow path 234 is continuously open such that blowby gas stream 230 can continuously flow therethrough and through the first orifice 216.

The blowby gas stream 230 accelerates axially through the second orifice 214 and/or the first orifice 216 and impacts the oil management cover 14 disposed above the orifices 216, 214. The oil management cover 14 comprises a baffle (e.g., inertial impaction plate) 26 spaced a distance axially above the orifices 216, 214 (e.g., perpendicular) and a fibrous media 204 disposed below the baffle 26. The baffle 26 is located axially above the fibrous media 204 and comprises a flange 218 extending axially downward from a side of the baffle 26. The flange 218 extends from the baffle 26 in a crescent manner on the side of the baffle 26 closest to the cleaned air outlet 22, forming an inner surface (e.g., tapered wall). In some embodiments, the flange 218 is disposed on a side away from the drain 24 and may be partially aligned with the axis of the first flow path 234. As will be appreciated, the flange 218 is substantially tapered (e.g., flared) from the separation zone towards the drain 24 in a manner that is complementary to the raised portion 32 (e.g., housing step) on the bottom of the housing 12. As used herein, the term "tapered" refers to a decreasing cross section of the flange 218 as it gets further from the baffle 26. In some embodiments, the raised portion 32 is not a part of the housing 12, for example, the inlet 206 came from the bottom, directly beneath the valve 212 and the biasing member 210. While the baffle 26 is shown as asymmetrical, other baffle 26 configurations, including symmetrical baffles, are possible arrangements to bias separated liquid 30 towards the drain 24 and away from the cleaned air outlet 22. Further, the flange 218 may include a wide variety of peak and valley configurations to bias separated liquid 30 towards the drain 24 and away from the cleaned air outlet 22.

As shown in FIGS. 1A, 1B, & 2, the baffle 26 is substantially disc shaped, however, the baffle 26 may be shaped differently to accommodate the gas-liquid separator 10 and/or the desired flow path direction. Accordingly, the flange 218 may possess a wide variety of shapes and angles to direct the separated liquid 30 from the baffle (e.g., inertial impaction plate) 26 to the drain 24 and accommodate the configuration of the gas-liquid separator 10. Additionally, the inner surface 220 may include grooves, extrusions, textures, or other features, as described in greater detail below in FIGS. 3 and 4, to facilitate drainage of the separated liquid 30. The inner surface 220 formed by one or more surfaces can comprise a wide variety of passage cross-sectional shapes, for example, an inner surface 220 having circular, rectangular, oval, etc. cross-sectional shapes. The fibrous media 204 is structured to filter the blowby gas stream 230 passing through the filter media by coalescing and separating oils and aerosols contained in the blowby gas stream 230. For example, the fibrous media 204 may be a coalescing fibrous filter media. Additionally, the fibrous media 204 can sequester liquid (e.g., oil) out of the blowby gas stream 230 as it flows through the fibrous media 204. In some embodiments, the fibrous media 204 is only disposed on the flange 218 (e.g., not on the baffle 26). In other embodiments, the fibrous media 204 is disposed on both the flange 218 and the baffle 26. In still other embodiments, the fibrous media 204 is not used.

The disposition of the baffle 26 along the path of the accelerated blowby gas stream 230 causes liquid particle separation via a sharp directional change (e.g., swept angle) of the flow of the blowby gas stream 230 at an impaction zone. The baffle 26 may possess a wide variety of surfaces including a rough porous collection surface, a smooth impervious surface, and the like, to facilitate separation of the blowby gas stream 230 into separated clean air 40 and separated liquid 30. The separated liquid 30 contacts the flange 218 and, due to the tapered shape of the flange 218, is directed by the inner surface 220 towards the drain 24. The plurality of ribs 20 form a first channel 16 and a second channel 18 structured to direct separated liquid 30 from the oil management cover 14 towards the drain 24. The first channel 16 and the second channel 18 may be sloped towards the drain 24 to further facilitate the drainage of the separated liquid 30. In order to provide greater efficiency in draining the separated liquid 30, the plurality of ribs 20 can include additional ribs or channels, have different rib and channel heights, and be disposed in a wide variety of locations or orientations on the housing 12 with respect to the baffle 26. Separated clean air 40 travels around the oil management cover 14. As will be appreciated, without the oil management cover 14, separated liquid 30 may be shed (e.g., sheared off) from the inlet flow member 202 and be more likely to reach the cleaned air outlet 22 (e.g., re-entrainment).

Figure 3:
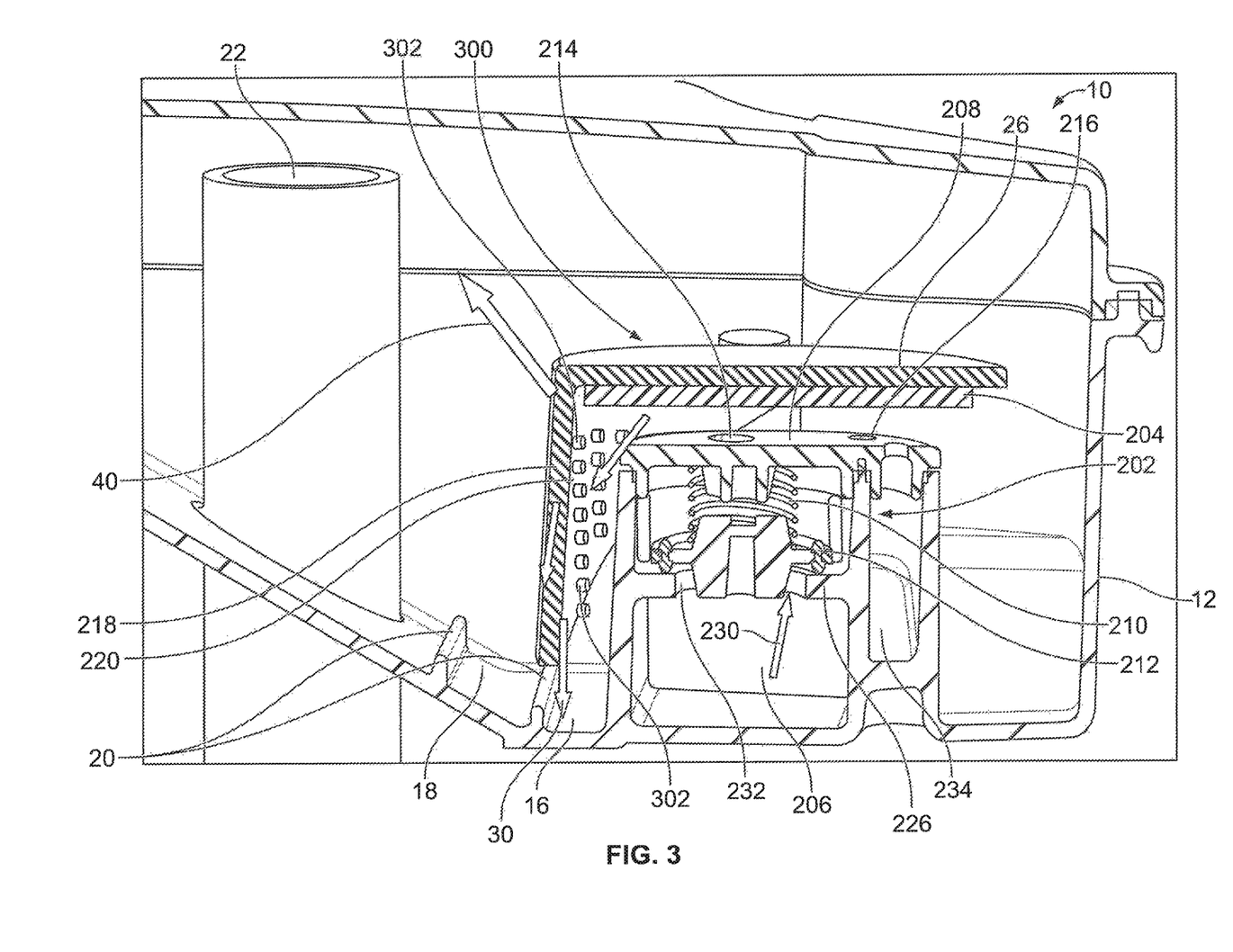
FIG. 3 shows a cross-sectional view of a portion of a gas-liquid separator that includes an oil management cover with wall extrusions according to another example embodiment.

Referring to FIG. 3, a cross-sectional view of a portion of a gas-liquid separator 10 that includes an oil management cover 300 with a plurality of extrusions 302 on the inner surface 220 is shown, according to an example embodiment. The oil management cover 300 is similar to the oil management cover 14. A difference between the oil management cover 300 and the oil management cover 14 is the disposition of a plurality of extrusions 302 on the inner surface 220 of the oil management cover 300. Accordingly, like numbering is used to designate like parts between the oil management cover 300 and the oil management cover 14. The oil management cover 300 includes a plurality of extrusions 302 disposed on the inner surface 220 to enhance the impaction and collection of the separated liquid 30 on the plurality of extrusions 302, thereby increasing the collection efficiency of the baffle 26.

The plurality of extrusions 302 protrude from the inner surface 220 substantially orthogonal to the flow of the separated liquid 30 and extend radially from the inner surface 220 towards the inlet flow member 202. The plurality of extrusions 302 are structured to increase inertial impaction of the separated liquid 30 and direct the separated liquid 30 toward the drain 24. The plurality of extrusions 302 can include de-misters, small inertial impactors (e.g., compact versions of an inertial impaction plate), or similar structures that are large enough to cause inertial impaction, but small enough to not cause an excessive pressure drop. The additional inertial impaction surfaces provide more impaction zones, and thus separation zones, throughout the oil management cover 300 compared to the oil management cover 14. Accordingly, each of the plurality of extrusions 302 reduce carryover of the separated liquid 30 and facilitate flow direction of the separated liquid 30 toward the drain 24. While a plurality of extrusions 302 are shown in FIG. 3, a single extrusion may be used. Beneficially, the plurality of extrusions 302 further prevent the separated liquid 30 flow from shedding into the separated clean air 40 flow and reaching the cleaned air outlet 22 (e.g., re-entrainment). In other words, the plurality of extrusions 302 prevent the separated liquid 30 from shearing off from the inner surface 220 and flowing towards the cleaned air outlet 22.

Figure 4:
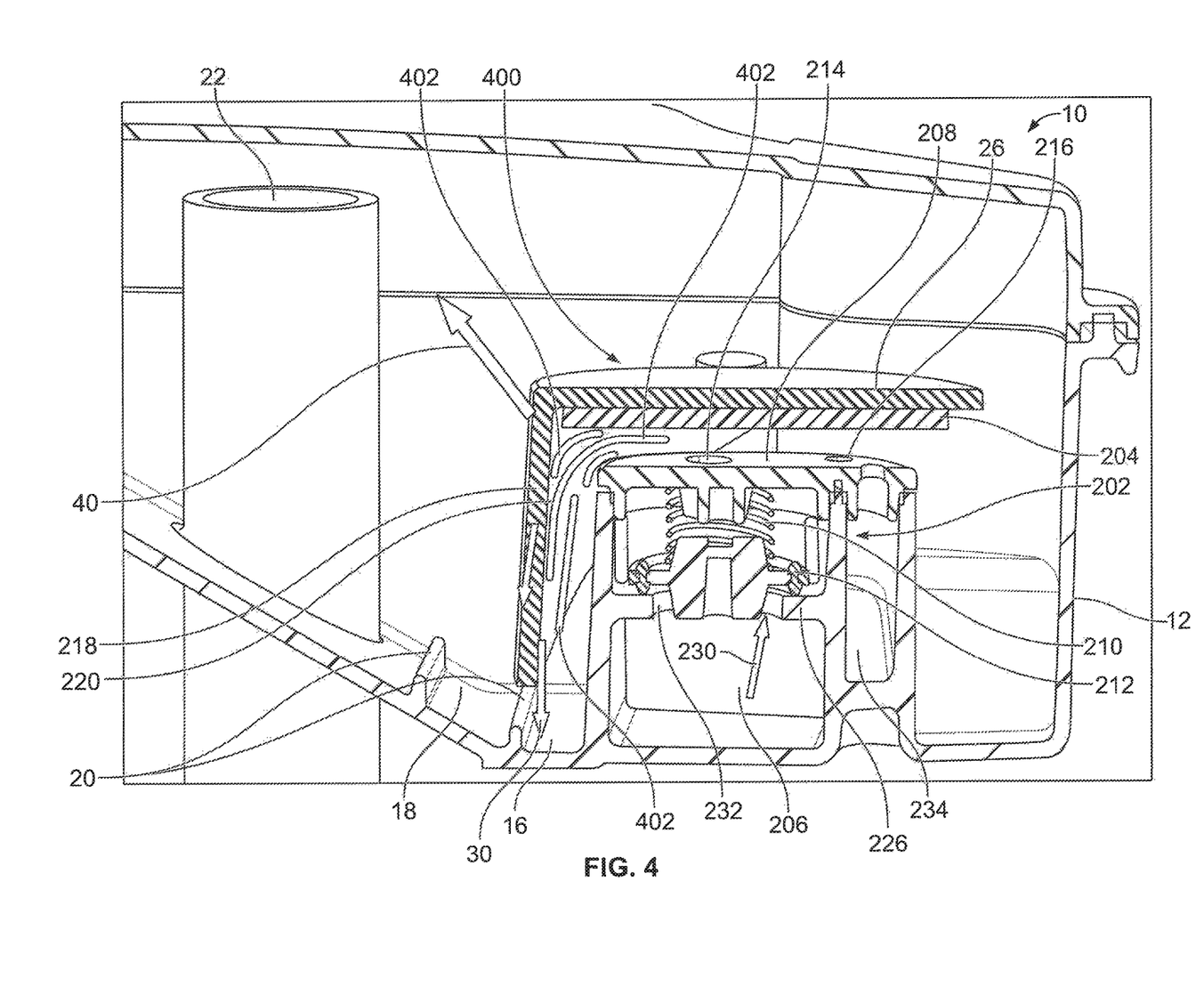
FIG. 4 shows a cross-sectional view of a portion of a gas-liquid separator that includes an oil management cover with wall grooves according to a further example embodiment.

Referring to FIG. 4, a cross-sectional view of a portion of a gas-liquid separator 10 that includes an oil management cover 400 with a plurality of grooves 402 on the inner surface 220 is shown, according to an example embodiment. The oil management cover 400 is similar to the oil management cover 14. A difference between the oil management cover 400 and the oil management cover 14 is the disposition of a plurality of grooves 402 on the inner surface 220 of the oil management cover 400. Accordingly, like numbering is used to designate like parts between the oil management cover 400 and the oil management cover 14. The oil management cover 400 includes a plurality of grooves 402 disposed on the inner surface 220 to enhance the collection of the separated liquid 30 on the plurality of grooves 402, thereby increasing the collection efficiency of the baffle 26. One such groove structure of the plurality of grooves for directing and enhancing the collection of the separated liquid 30 is described, for example, in U.S. Pat. No. 9,194,265 (the contents of which are incorporated herein by reference).

The plurality of grooves 402 are defined along the streamline of the separated liquid 30 flow in the inner surface 220. The plurality of grooves 402 are structured to increase collection of separated liquid 30 and enhance directional control of the flow of the separated liquid 30 toward the drain 24. The plurality of grooves 402 can include helical grooves, vanes, or indentations along the tapered inner surface 220 to increase collection of the separated liquid 30 and provide a more concentrated and directed flow path towards the drain 24. The additional flow paths provided by the plurality of grooves 402 along the inner surface 220 capture a greater amount of separated liquid 30 for the oil management cover 400 compared to the oil management cover 14. Accordingly, each of the plurality of grooves 402 reduce carryover of the separated liquid 30 and facilitate flow direction of the separated liquid 30 toward the drain 24. Beneficially, the plurality of grooves 402 further prevent the separated liquid 30 flow from shedding into the separated clean air 40 flow and reaching the cleaned air outlet 22. In other words, the plurality of grooves 402 prevent the separated liquid 30 from shearing off from the inner surface 220 and flowing towards the cleaned air outlet 22.

In some embodiments, a plurality of ribs may protrude from the inner surface 220 such that the plurality of grooves 402 include flow channels defined between the plurality of ribs. In such embodiments, the plurality of ribs are along the streamline of the separated liquid 30 flow and protrude from the inner surface 220 towards the inlet flow member 202. In some embodiments, each rib in the plurality of ribs is parallel to one another, in other embodiments. Each rib in the plurality of ribs is not parallel or radial to one another. In some embodiments, the plurality of grooves 402 and the plurality of ribs may be used to enhance collection efficiency of the oil management cover 400.

Figure 5A:
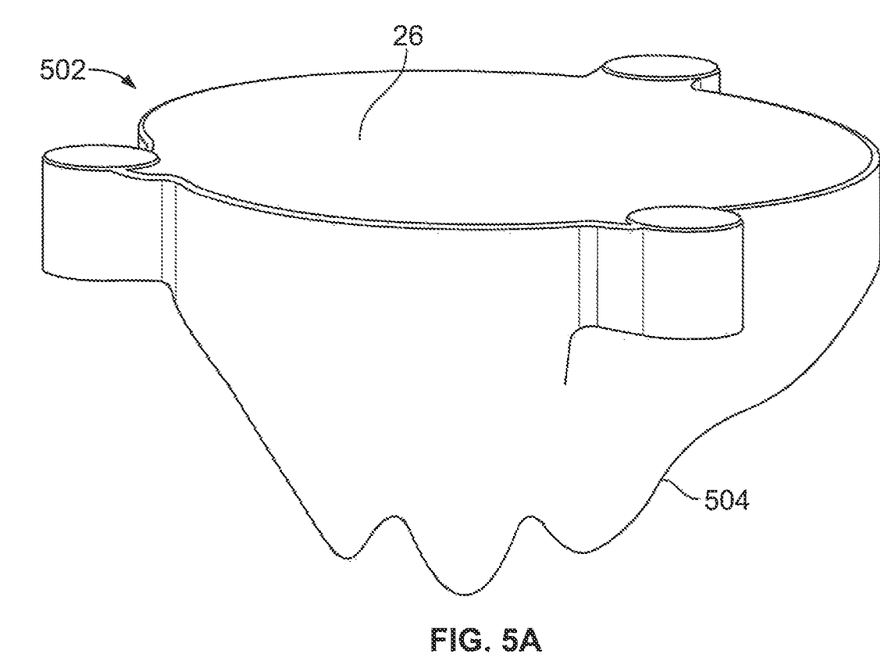
FIG. 5A shows a perspective view of an oil management cover according to another example embodiment.

FIG. 5A shows a perspective view of an oil management cover 502, according to another example embodiment. The oil management cover 502 is similar to the oil management cover 14. A difference between the oil management cover 502 and the oil management cover 14 is the configuration of the tapered flange 504 of the oil management cover 502. Accordingly, like numbering is used to designate like parts between the oil management cover 502 and the oil management cover 14. The tapered flange 504 has a plurality of substantially rounded protrusions, with each rounded protrusion sized and angled to facilitate the separated liquid 30 flow towards the drain 24. While FIG. 5A shows a tapered flanged 504 with three rounded protrusions, other embodiments include a different number of rounded protrusions. Further, similar curved shapes, such as helical, elliptical, pointed, etc., may be used on the tapered flange 504.

Figure 5B:
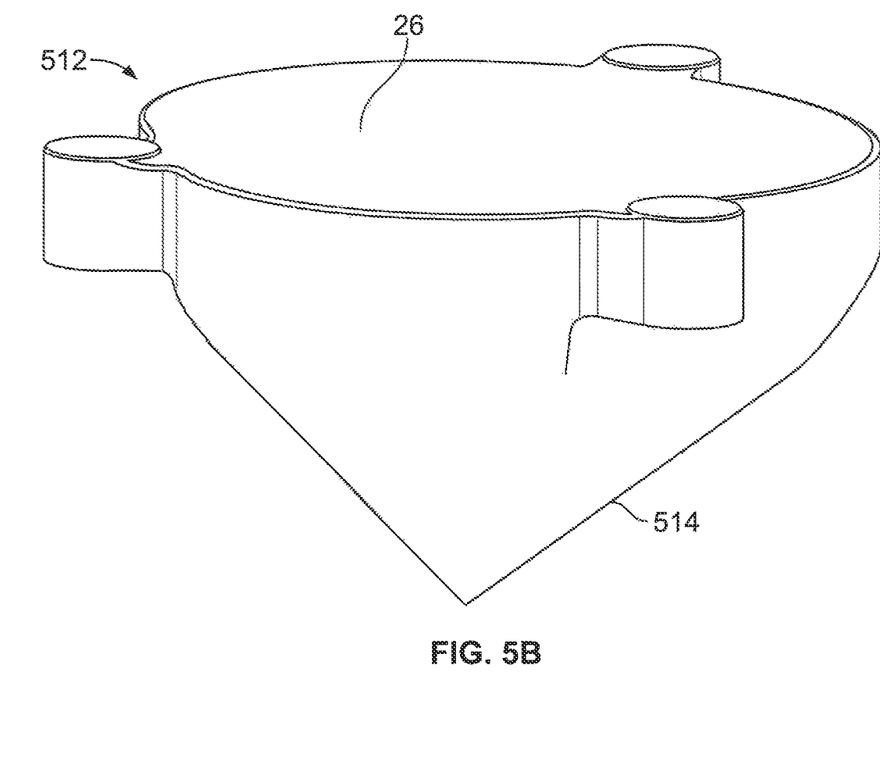
FIG. 5B shows a perspective view of an oil management cover according to still another example embodiment.

Turning to FIG. 5B, a perspective view of an oil management cover 512 is shown, according to still another example embodiment. The oil management cover 512 is similar to the oil management cover 14. A difference between the oil management cover 512 and the oil management cover 14 is the configuration of the tapered flange 514 of the oil management cover 512. Accordingly, like numbering is used to designate like parts between the oil management cover 512 and the oil management cover 14. The tapered flange 514 has an angled surface with respect to the baffle 26 of the oil management cover 512. In some embodiments, the tapered flange 514 is substantially angled towards the bottom of the housing 12 in the direction of the drain 24. For example, the tapered flange 514 is angled at a substantially 45-degree angle toward the center of the oil management cover 512 such that a substantially 90-degree angle is formed at the base (e.g., valley) of the tapered flange 514. While the tapered flange 514 is shown having a substantially centered valley, different locations and angles of the valley are possible to facilitate drainage of the separated liquid 30 to the drain 24. Additionally, the tapered flange 514 may include additional peaks and valleys along the length of the tapered flange 514.

While multiple embodiments describe various dimensions and configurations of the oil management cover and plurality of ribs, it is anticipated that the oil management cover and plurality of ribs may have a cross-section of a wide variety of target shapes and sizes and may be disposed in a wide variety of locations to facilitate drainage of the separated liquids in a wide variety of gas-liquid separators.

References herein to the positions of elements (e.g., "top," "bottom," "above," "below," etc.) are merely used to describe the orientation of various elements in the Figures. It should be noted that the orientation of various elements may differ according to other example embodiments, and that such variations are intended to be encompassed by the present disclosure.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A gas-liquid separator comprising:
   a housing comprising:
   an inlet structured to receive a blowby gas stream from a crankcase;
   a cleaned air outlet; and
   a liquid outlet; and
   a cover coupled to the housing, the cover disposed downstream from the inlet and upstream from the liquid outlet, the cover comprising:
   a baffle disposed over the blowby gas stream flow path from the inlet such that the blowby gas stream impacts the baffle and separates liquid and aerosol contained in the blowby gas stream,
   the baffle comprising a flange extending substantially axially downward from only a portion of and less than an entirety of a radial peripheral edge of the baffle and partially surrounding the blow by gas stream flow path, the flange tapered substantially axially downward forming an inner surface, the inner surface structured to route the separated liquid toward the liquid outlet and bias separated liquid away from shedding toward the cleaned air outlet.

2. The gas-liquid separator of claim 1, further comprising a plurality of extrusions protruding from the inner surface of the baffle, the plurality of extrusions being substantially orthogonal to the separated liquid flow and extending radially from the inner surface toward the inlet.

3. The gas-liquid separator of claim 1, further comprising a plurality of grooves defined in the inner surface, the plurality of grooves being substantially orthogonal to the separated liquid flow.

4. The gas-liquid separator of claim 1, further comprising a plurality of ribs protruding from the inner surface so as to define a plurality of grooves therebetween, the plurality of ribs being substantially orthogonal to the separated liquid flow and extending radially from the inner surface toward the inlet.

5. The gas-liquid separator of claim 1, further comprising a rib forming a channel directed towards the liquid outlet for guiding separated liquid from the cover towards the liquid outlet and away from the cleaned air outlet.

6. The gas-liquid separator of claim 1, further comprising at least one flow path and at least one orifice disposed downstream from the inlet and upstream from the cover, the at least one flow path configured to receive the blowby gas stream from the inlet and accelerate the blowby gas stream in a downstream direction through a corresponding orifice of the at least one orifice.

7. The gas liquid separator of claim 6, further comprising a nozzle plate disposed between the inlet and the cover, the at least one orifice defined in the nozzle plate.

8. The gas liquid separator of claim 7, wherein the at least one orifice comprises a venturi or defines a frustoconical shape, the at least one orifice structured to accelerate blowby gases towards the baffle.

9. The gas-liquid separator of claim 6, wherein the baffle further comprises an inertial impaction plate spaced downstream and in line with the orifice, the inertial impaction plate configured to cause liquid and gas separation of the blowby gas stream.

10. The gas-liquid separator of claim 1, further comprising a fibrous media disposed below the baffle and configured to filter the blowby gas stream.

11. The gas-liquid separator of claim 1, wherein the flange comprises a tapered flange.

12. The gas-liquid separator of claim 11, wherein the tapered flange comprises a plurality of substantially rounded protrusions defined at an axial end thereof distal from the baffle.

13. The gas-liquid separator of claim 11, wherein the tapered flange is angled towards a bottom of the housing in a direction towards the liquid outlet.

14. A cover disposed downstream from an inlet and upstream from a liquid outlet of a crankcase ventilation system, the cover comprising:
a baffle disposed over the blowby gas stream flow path from the inlet such that the blowby gas stream impacts the baffle and separates liquid and aerosol contained in the blowby gas stream,
the baffle comprising a flange extending substantially axially downward from only a portion of and less than an entirety of a radial peripheral edge of the baffle, the flange tapered substantially axially downward forming an inner surface and partially surrounding the blow by gas stream flow path, the inner surface structured to route the separated liquid toward the liquid outlet and bias separated liquid away from shedding toward a cleaned air outlet of the crankcase ventilation system.

15. The cover of claim 14, further comprising a plurality of extrusions protruding from the inner surface of the baffle, the plurality of extrusions being substantially orthogonal to the separated liquid flow and extending radially from the inner surface toward the inlet.

16. The cover of claim 14, further comprising a plurality of grooves defined in the inner surface, the plurality of grooves being substantially orthogonal to the separated liquid flow.

17. The cover of claim 14, further comprising a plurality of ribs protruding from the inner surface so as to define a plurality of grooves therebetween, the plurality of ribs being substantially orthogonal to the separated liquid flow and extending radially from the inner surface toward the inlet.

18. The cover of claim 14, further comprising a fibrous media disposed below the baffle and configured to filter the blowby gas stream.

19. The cover of claim 14, wherein the flange comprises a tapered flange.

20. The cover of claim 19, wherein the tapered flange comprises a plurality of substantially rounded protrusions defined at an axial end thereof distal from the baffle.

21. The cover of claim 19, wherein the tapered flange is angled towards a bottom of the housing in a direction towards the liquid outlet.

* * * * *